July 27, 1971    F. NIXON    3,595,635
PROTECTIVE GAS SUPPLY SYSTEM FOR A GLASS FLOAT FURNACE
Filed Sept. 26, 1968    3 Sheets-Sheet 3

Inventor
Frank Nixon
By
Morrison, Kennedy & Campbell
Attorneys

United States Patent Office 3,595,635
Patented July 27, 1971

3,595,635
PROTECTIVE GAS SUPPLY SYSTEM FOR A GLASS FLOAT FURNACE
Frank Nixon, Billinge, near Wigan, England, assignor to Pilkington Brothers Limited, Liverpool, England
Filed Sept. 26, 1968, Ser. No. 762,736
Claims priority, application Great Britain, Nov. 15, 1967, 52,036/67
Int. Cl. C03b 18/02
U.S. Cl. 65—157                                    4 Claims

ABSTRACT OF THE DISCLOSURE

Protective atmosphere containing hydrogen is supplied to the headspace over the molten metal bath in the float process for flat glass manufacture, and gases are withdrawn from the headspace at a controlled rate along an elongated path communicating with the headspace.

BACKGROUND OF THE INVENTION

This invention relates to apparatus for use in the manufacture of flat glass and more especially to apparatus for use in carrying out the float process in which glass in ribbon form is advanced along a bath of molten metal contained in a tank structure over which a roof structure defines a headspace in which a protective atmosphere is maintained at a plenum.

The protective atmosphere which is supplied into the headspace over the bath is an atmosphere which will not react chemically with the molten metal of the bath to produce contaminants for the glass. Usually a reducing constituent, for example a percentage of hydrogen, is included in the atmosphere.

The protective atmosphere is maintained at a plenum in the headspace over the bath so that there is a continuous flow of protective atmosphere from the head space through the inlet through which glass is delivered to the bath either in the form of a rolled ribbon of glass or as a molten layer of glass formed on the bath by pouring molten glass at a controlled rate onto the surface of the bath. Further, protective atmosphere flows from the headspace over the bath through the outlet from the tank structure through which the ultimate ribbon of glass is discharged from the bath onto conveyor rollers which convey the glass through an annealing lehr. The outflow of protective atmosphere through the inlet and outlet for glass prevents ingress of ambient atmosphere into the headspace over the bath.

In addition to these outflows of protective atmosphere from the headspace, it has now been found advantageous to extract atmosphere from the headspace over the bath at selected points along the bath so as to engender flows of protective atmosphere within the headspace in such a manner as to reduce the level of volatile components in the atmosphere over the bath, and to reduce the carrying of volatile components by protective atmosphere flows from the hot end of the bath to the cool end of the bath.

In providing venting arrangements, in particular in the region of the hot end of the bath where the temperature may be in the region of 1,000° C., it is important to avoid any leakage of oxygen in the headspace over the bath, and it is the main object of the present invention to provide improved venting arrangements for the extraction of atmosphere from the headspace over the bath which avoids the introduction of oxygen into the headspace over the bath.

SUMMARY

According to the invention apparatus for use in the manufacture of flat glass in which glass in ribbon form is advanced along a bath of molten metal comprises a structure including a tank containing the molten metal bath and a roof over the bath means for supplying protective atmosphere containing hydrogen into the headspace defined by the roof structure over the bath, and an outlet from the structure which outlet defines an elongated path communicating directly with the headspace and pumping means connected to the outer end of the path for withdrawing gases from the headspace along that path at a controlled rate.

The provision of the elongated path through which the atmosphere is withdrawn ensures that any oxygen tending to migrate from the ambient atmosphere through the venting arrangements towards the headspace over the bath is burned with hydrogen in the gases being withdrawn through the path. The path may be a straight path, maintained at the appropriate temperature but preferably the outlet defines a tortuous path communicating directly with the headspace and connected at its outer end to said pumping means.

In a preferred embodiment of the invention the tortuous path of the outlet is defined in the side block of the tank structure by baffle plates, one end of the path communicating with the headspace through a port in the inner face of the side block, and the other end of the path being connnected to an extract duct extending through the outer face of the side block and connected to the pumping means.

Preferably the pumping means is an air jet pump which is connected to the extract duct. A condenser may be provided in the connection between the air jet pump and the extract duct.

DESCRIPTION OF THE PREFERRED EMBODIMENT

Figure 1:
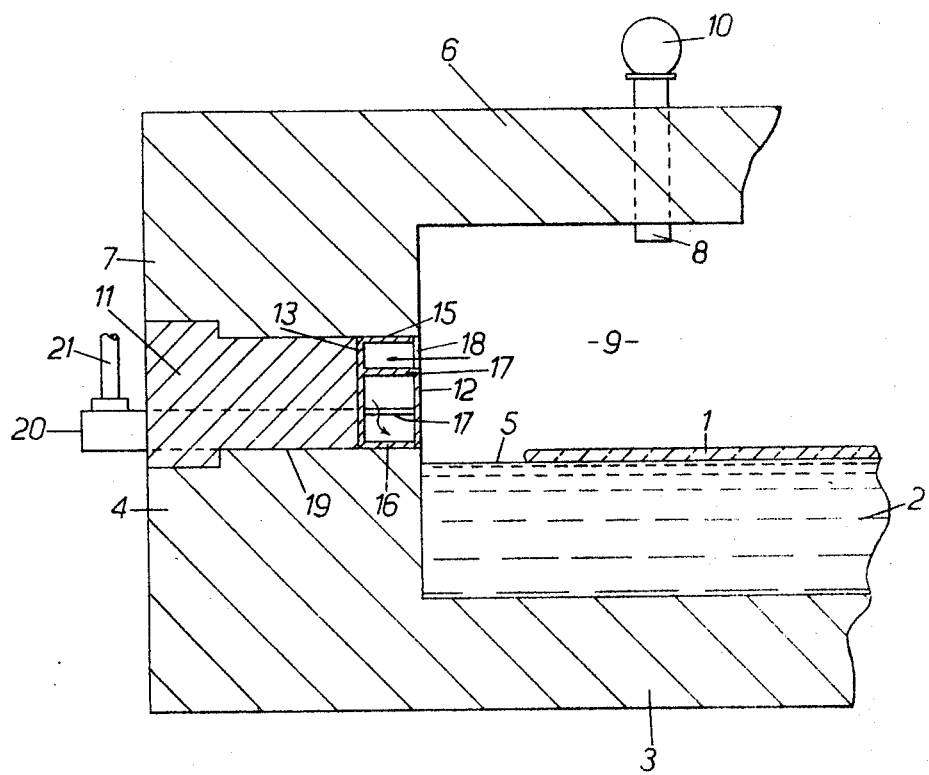
FIG. 1 is a sectional elevation through a part of one side of a tank structure containing a bath of molten metal along which a ribbon of glass is being advanced, and showing the provision of a side vent block according to the invention in the side wall of the tank structure.

Referring to the drawings, a ribbon of glass 1 is being advanced along a bath of molten metal 2 contained in a tank structure comprising a floor 3 and integral side walls 4 one of which is shown. The tank includes, in known manner, end walls at the inlet and outlet end of the tank which are part of the integral refractory structure also comprising the floor 3 and the side walls 4. Detail of the refractory structure is omitted for the sake of clarity.

The surface of the molten metal bath is indicated at 5 and there is an exposed strip of the molten metal surface alongside both edges of the ribbon of glass being advanced along the bath. A roof structure is supported over the tank structure and comprises a roof 6 and side walls parts 7 of the roof structure. The roof structure also has end walls which in known manner co-operate with the end walls of the tank structure to define inlets and outlets for the glass.

Supported in the roof structure are inlet ducts 8, one of which is shown, for supplying protective atmosphere for example an atmosphere consisting of 95% nitrogen and 5% hydrogen, into the headspace 9 defined by the roof structure over the bath of molten metal. The duct 8 which is one of many ducts depending downwardly through the roof structure is connected to a header 10 mounted above the roof structure, which header is connected to central means for supplying protective atmosphere through duct 8 into the headspace over the bath.

Figure 2:
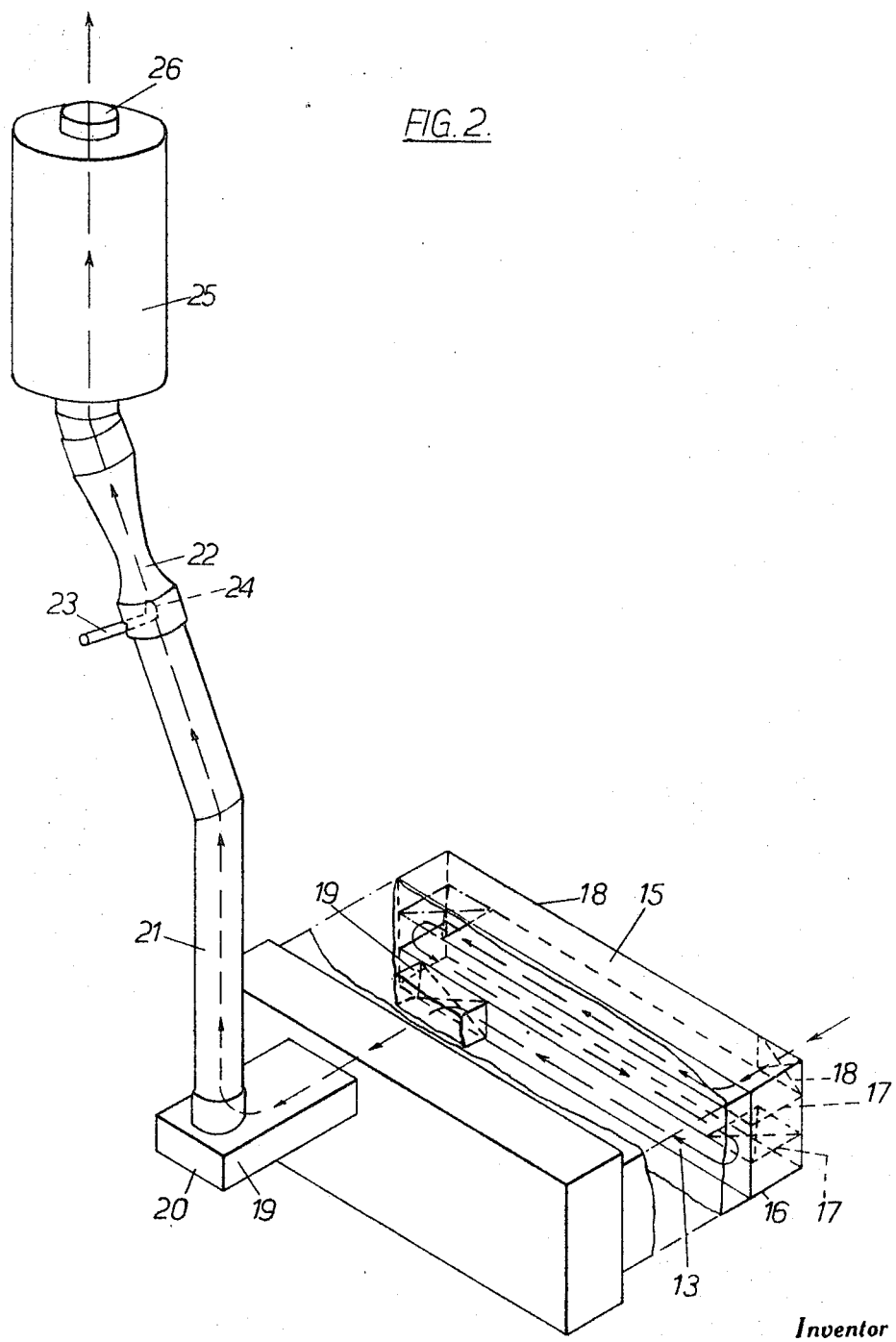
FIG. 2 is a perspective view of the side vent block of FIG. 1 showing its connection to an air jet pump.

Upstream of the duct 8 considered in the direction of advance of the ribbon of glass along the bath a side vent block 11 is mounted in the side wall of the tank structure between the upper surface of the side wall 4 of the tank structure and the lower surface of the side wall 7 of the roof structure. One such side vent block is illustrated in FIGS. 1 and 2 but it will be understood that there would usually be a pair of side vents opposite each other in the side walls of the tank structure and pairs of such vents may be provided at spaced intervals along the tank structure, which is of elongated form.

The side vent block is a refractory block in which there is an outlet for gas from the headspace over the bath which outlet defines an elongated tortuous path communicating directly with the headspace.

In the embodiment illustrated, this tortuous path is defined by metal plates comprising an inner face plate 12 which is exposed to the atmosphere in the headspace over the bath and an outer face plate 13 which is embedded in the refractory material of the block 11. Between the face plates there is a rectangular space which is closed at its top and bottom by closure plates 15 and 16 and is divided by baffle plates 17 into a tortuous duct which is illustrated in FIG. 2 in greater detail. In one top corner of the inner face plate 12 there is formed a port 18 which communicates directly with the headspace 9 over the bath. At the diagonally opposite corner of the tortuous path an extract duct 19 is connected to the end of the tortuous path and extends through the refractory block 11 and the outer face of that block. The outer end of the extract duct 19 is sealed off as indicated at 20, and a connection duct 21 is connected into the upper face of the outer end of the duct 19. The connection duct 21 extends upwardly to an air jet pump which is indicated diagrammatically at 22. Air is suplied under pressure into the jet pump in known manner through an air supply duct which ends in a nozzle 24 directed upwardly in the jet pump. The jet pump can be controlled to give a rate of extraction from for example 800 cubic ft. per hour to 7000 cubic ft. per hour.

A silencer 25 is fixed to the outer end of the jet pump and from the silencer the extracted atmosphere passes through an outlet duct indicated at 26.

The baffle plates 17 fixed between the face plates 12 and 13 provide a tortuous path having a cross-sectional area sufficient to enable the desired rate of extraction of gases to be sustained, and running for a sufficient length to enable any oxygen migrating inwardly towards the headspace over the bath to be burnt by hydrogen being extracted through the port 18 from the headspace over the bath in the vented gases.

Figure 3:
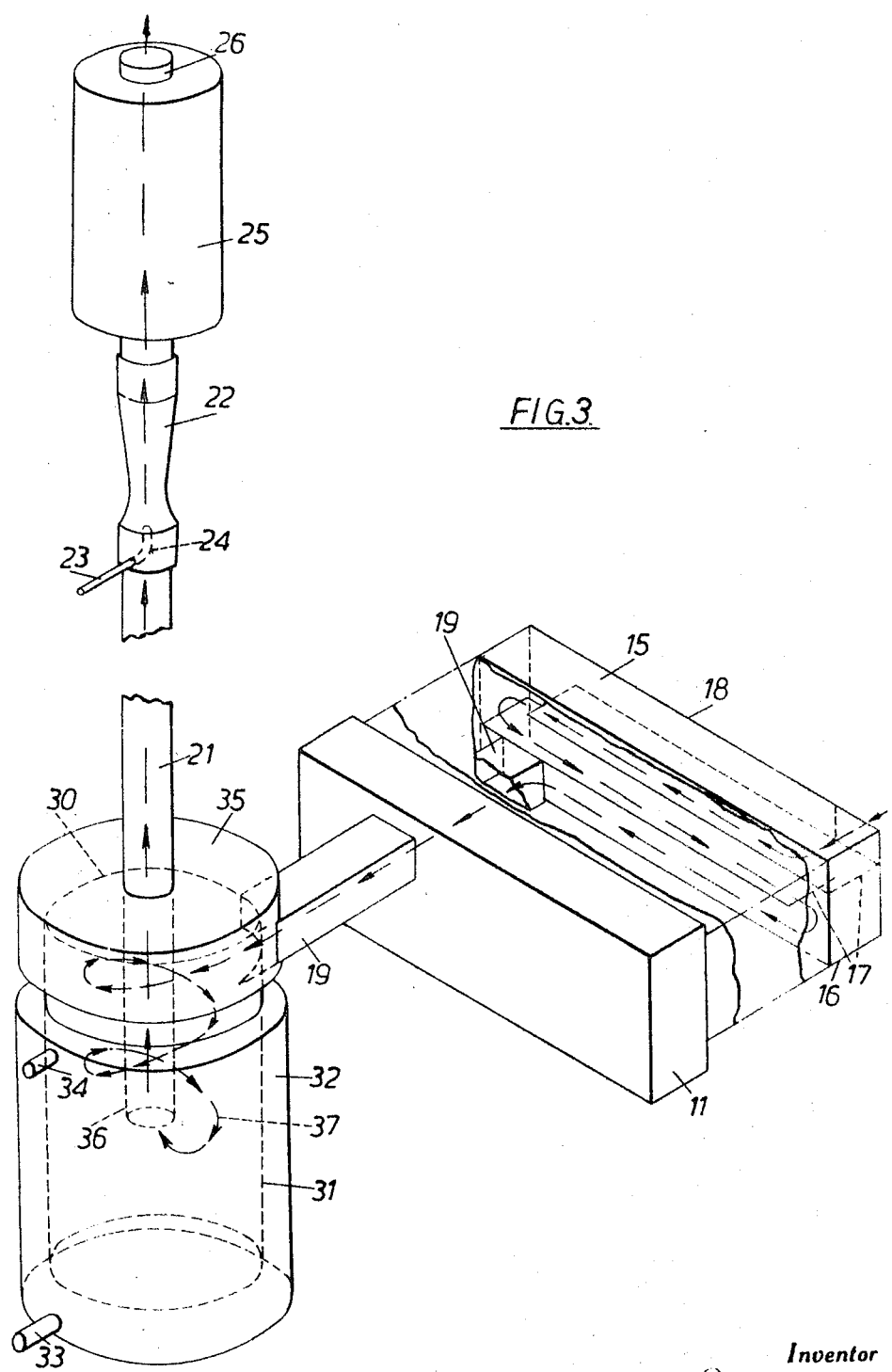
FIG. 3 is a view similar to FIG. 2 showing a condenser connected between the side vent block and the air jet pump.

A condenser may be fitted in the connection duct, as illustrated in FIG. 3, to condense volatile constituents extracted from the headspace before they reach the jet pump.

The extract duct 19 is connected eccentrically to the removable top 30 of a cylindrical condenser whose main body 31 is surrounded by a water jacket 32 through which water is circulated by means of inlet and outlet pipes 33 and 34. The top part 30 of the condenser is jacketed with a thermally insulating jacket 35.

Since the side vent blocks are at a temperature only slightly below the temperature existing in the headspace over the bath of molten metal, the temperature at which gases are extracted from the bath is in the range of about 1000° C. at the hot end of the bath down to about 650° C. at the cold end of the bath and within this temperature range any oxygen tending to leak towards the headspace over the bath through the venting blocks is eliminated by being burnt with hydrogen in the tortuous path, the resulting water vapour being carried away in the flow of gases being extracted. The gas flows are indicated by arrows in the drawings.

The plenum of protective atmosphere is maintained at a slight over-pressure, for example about 3 or 4 mm. of water gauge, and the rate of extraction through the side vent blocks is controlled at a rate commensurate with the rate of supply of protective gases into the headspace through the inlet duct 8 so as to ensure the maintenance of the slight plenum of protective atmosphere in the headspace.

In another embodiment of the invention one or more similar outlets may be provided in the roof structure spaced from the inlet ducts 8, so as to provide a desired gaseous flow through the headspace.

A central suction outlet pipe 36 is fixed in the top part 30 of the condenser and is joined to the connection duct 21. The pipe 36 extends for some way down into the cooled lower part of the condenser.

Because of the eccentric connection of the extract duct 19 to the condenser gases sucked into the condenser spin against the cooled inner surface of the condenser as indicated at 37 prior to being sucked through the central pipe. Condensates from the gases fall to the bottom of the condenser which can be cleaned from time-to-time by removal of the top part 30.

The flow of protective atmosphere through the headspace engendered by the venting results in volatile components being extracted from the headspace, particularly at the hot end of the bath, and this continuous extraction of volatile components without any danger of oxygen leakage is an advantage additional to the advantageous effect of the continuous renewal of the atmosphere in the headspace over the bath which enhances the continuous protection of the exposed molten metal alongside the path of travel of the ribbon of glass.

We claim:

1. Apparatus for use in the manufacture of flat glass in which glass in ribbon form is advanced along a bath of molten metal; comprising a tank structure containing the bath of molten metal; a roof defining a headspace over the bath; means for supplying protective atmosphere containing hydrogen into the headspace defined by the roof over the bath; a tortuous outlet path for atmosphere from the headspace defined in a side block of the tank structure between a port formed in the inner face of the side block and communicating directly with the headspace, and an extract duct extending through the side block to an outlet port formed in the outer face of the side block; and pumping means connected to said extract duct.

2. Apparatus for use in the manufacture of flat glass in which glass in ribbon form is advanced along a bath of molten metal, comprising a tank structure containing the bath of molten metal; a roof defining a headspace over the bath; means for supplying protective atmosphere containing hydrogen into the headspace defined by the roof over the bath; a tortuous outlet path for atmosphere from the headspace defined in a refractory side block of the tank structure by an inner face plate formed with a port which communicates directly with the headspace, an outer face plate embedded in the refractory side block and formed with an outlet port, and baffle plates fixed between said face plates to define said tortuous outlet path between the ports in the face plates; an extract duct extending through the refractory side block to said outlet port in the outer face plate; and pumping means connected to said extract duct.

3. Apparatus according to claim 2, wherein the pumping means is an air jet pump which is connected to the extract pump.

4. Apparatus according to claim 2, including a condenser connected between the extract duct and the air jet pump to remove volatile constituents from the gases withdrawn from the headspace.

References Cited

UNITED STATES PATENTS 3,356,476  12/1967  Gulotta _____ 65—182X
3,480,420  11/1969  Loukes et al. _____ 65—182X

FOREIGN PATENTS 1,096,538  1/1961  Germany.

ARTHUR D. KELLOGG, Primary Examiner

U.S. Cl. X.R.
65—182R